(12) United States Patent
Bertz et al.

(10) Patent No.: US 9,407,940 B1
(45) Date of Patent: Aug. 2, 2016

(54) USER-TARGETED AD INSERTION IN STREAMING MEDIA

(75) Inventors: Lyle T. Bertz, Lee's Summit, MO (US); Yaojun Sun, South Riding, VA (US); Christopher J. Mateski, Overland Park, KS (US); Chuma U. Agogbua, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1519 days.

(21) Appl. No.: 12/052,281

(22) Filed: Mar. 20, 2008

(51) Int. Cl.
| | |
|---|---|
| *H04N 7/10* | (2006.01) |
| *H04N 7/025* | (2006.01) |
| *H04N 7/173* | (2011.01) |
| *H04N 7/16* | (2011.01) |
| *H04N 21/234* | (2011.01) |
| *H04N 21/45* | (2011.01) |
| *H04N 21/81* | (2011.01) |
| *H04N 21/44* | (2011.01) |
| *H04N 21/258* | (2011.01) |
| *H04N 21/6405* | (2011.01) |

(52) U.S. Cl.
CPC ... *H04N 21/23424* (2013.01); *H04N 21/25883* (2013.01); *H04N 21/25891* (2013.01); *H04N 21/44016* (2013.01); *H04N 21/4532* (2013.01); *H04N 21/812* (2013.01); *H04N 21/6405* (2013.01)

(58) Field of Classification Search
None
See application file for complete search history.

(56) References Cited

U.S. PATENT DOCUMENTS

| | | | |
|---|---|---|---|
| 6,760,916 B2 * | 7/2004 | Holtz et al. | 725/34 |
| 6,771,644 B1 | 8/2004 | Brassil et al. | |
| 7,117,439 B2 * | 10/2006 | Barrett et al. | 715/719 |
| 7,203,758 B2 | 4/2007 | Cook et al. | |
| 7,751,315 B1 * | 7/2010 | Pai et al. | 370/230 |
| 7,856,646 B1 * | 12/2010 | Groff et al. | 725/42 |
| 2002/0042914 A1 * | 4/2002 | Walker | G06Q 30/02 725/36 |
| 2002/0067730 A1 * | 6/2002 | Hinderks et al. | 370/395.52 |
| 2002/0091574 A1 * | 7/2002 | Lefebvre et al. | 705/19 |
| 2002/0166127 A1 * | 11/2002 | Hamano | G06Q 30/02 725/105 |

(Continued)

OTHER PUBLICATIONS

Cisco Systems Inc., USA, "RTP/UDP/MPEG2 TS as a means of transmission for IPTV Streams", 1st FG IPTV meeting, Geneva, Switzerland, Jul. 10-14, 2006.

(Continued)

*Primary Examiner* — Jason K Lin

(57) ABSTRACT

Systems and apparatus for splicing a generic ad into a streaming media broadcast are provided when a user ad is not available. A splicer operates to receive streaming media on a primary channel, receive the user ad from a user ad server on a first channel, receive the generic ad from a generic ad server via a multicast address on a second channel, splice the user ad on the first channel into a streamed programming, splice the generic ad on the second channel into the streamed programming, and transmit the streamed programming into which ads have been spliced to a resulting channel. The generic ad server operates to transmit the generic ad to the multicast address. The user ad server operates to transmit the user ad over the first channel. The resulting channel operates to output the streamed programming.

12 Claims, 4 Drawing Sheets

(56) References Cited

U.S. PATENT DOCUMENTS

| | | | | |
|---|---|---|---|---|
| 2002/0184314 | A1* | 12/2002 | Riise | 709/205 |
| 2003/0023489 | A1* | 1/2003 | McGuire | G06Q 30/02 705/14.55 |
| 2003/0083938 | A1* | 5/2003 | Smith et al. | 705/14 |
| 2004/0024688 | A1* | 2/2004 | Bi | G06F 21/10 705/37 |
| 2005/0278741 | A1* | 12/2005 | Robarts et al. | 725/46 |
| 2006/0075449 | A1* | 4/2006 | Jagadeesan et al. | 725/113 |
| 2007/0043616 | A1* | 2/2007 | Kutaragi et al. | 705/14 |
| 2007/0299965 | A1* | 12/2007 | Nieh et al. | 709/224 |
| 2008/0250450 | A1* | 10/2008 | Larner et al. | 725/34 |

OTHER PUBLICATIONS

Brassil et al., "Enhancing Internet Streaming Media with Cueing Protocols", Infocom 2001 Twentieth Annual Joint Conference of the IEEE Computer and Communications Societies Proceedings. IEEE vol. 1, Issue , 2001.

Digital Program Insertion Splicing API, Society of Cable Telecommunications Engineers, Engineering Committee, Digital Video Subcommittee, www.scte.org/documents/standards/approved/SCTE302006.pdf.

Digital Program Insertion Cueing, Society of Cable Telecommunications Engineers, Engineering Committee, Digital Video Subcommittee, www.scte.org/documents/pdf/ANSISCTE352004.pdf.

\* cited by examiner

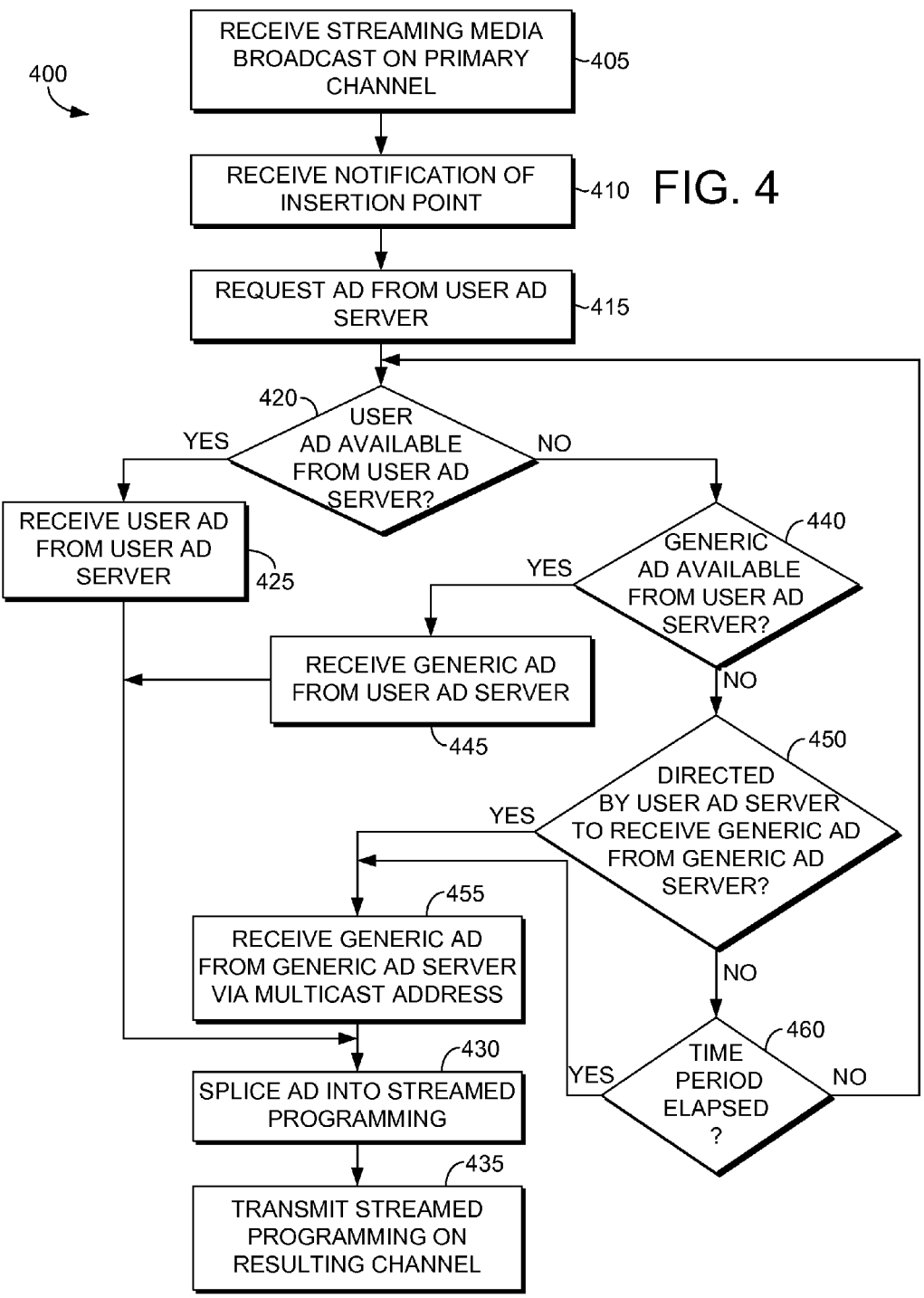

USER-TARGETED AD INSERTION IN STREAMING MEDIA

BACKGROUND

This invention relates generally to the insertion of ads into streaming media.

SUMMARY

The present invention is defined by the claims below. Embodiments of the present invention provide a system and apparatus for, among other things, inserting user-targeted ads into streaming media and ensuring that there is no dead air time if a user-targeted ad is not available. It is desirable to select ads that are targeted to a specific user based on criteria about the user or other means. The issue arises of what should be done if a user-targeted ad is not available when it is needed, because Service Level Agreements typically require that no more than three seconds elapse from the beginning of an ad insertion point to the time the ad is delivered to the user. The present invention uses multiple ad servers to provide both user-targeted ads and generic ads, and uses a splicer to insert ads from the multiple ad servers into streaming media. Because the response time of a typical ad server can be as great as two seconds, that leaves only one second to procure and splice another ad if a user-targeted ad is not available. The present invention meets this timing constraint and ensures that the requirements of the Service Level Agreement are met.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 4 is a flowchart illustrative of an embodiment of user-targeted ad insertion in streaming media.

DETAILED DESCRIPTION

Figure 1:
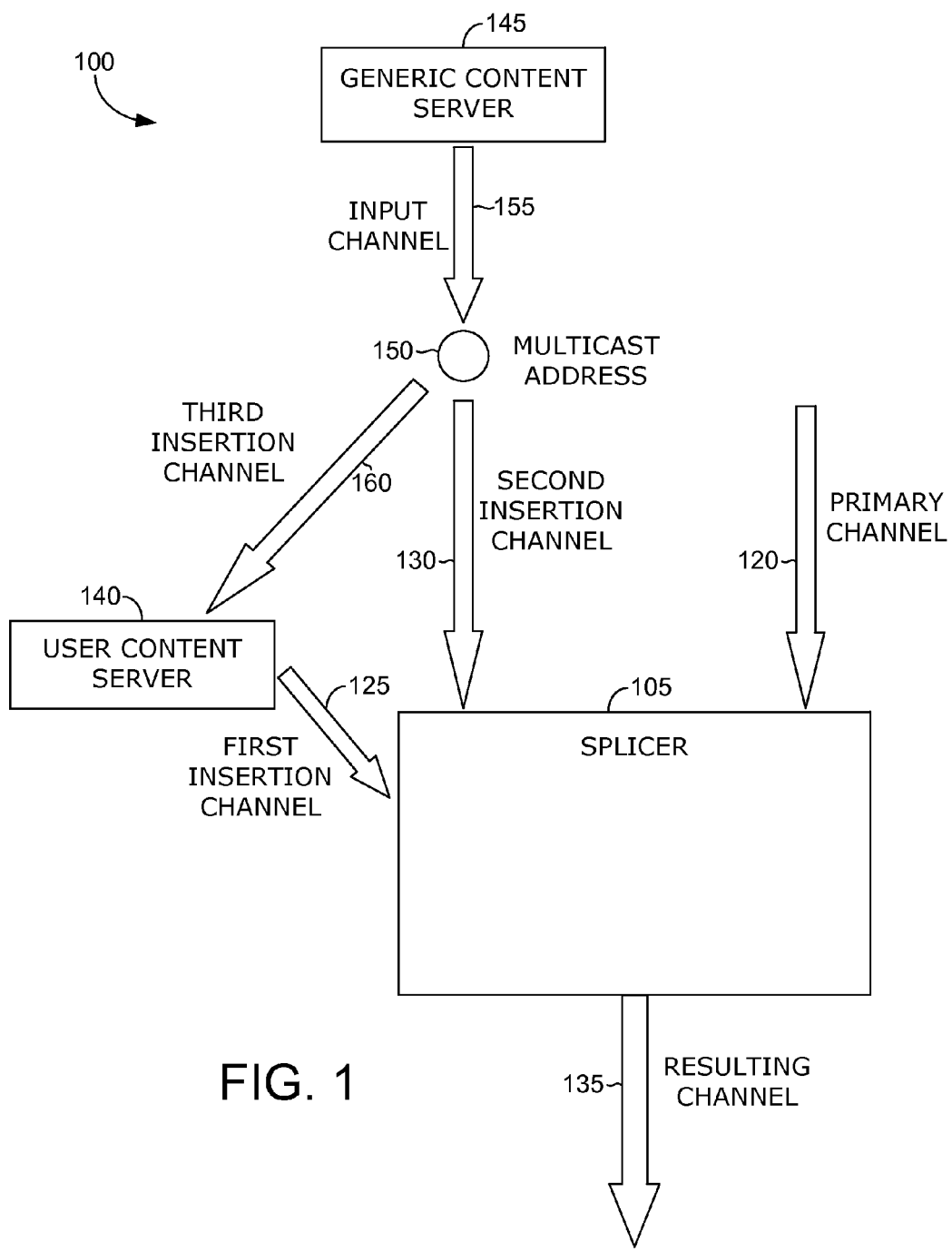
FIG. 1 is a block diagram of an exemplary system suitable for use in implementing embodiments of the present invention.

Embodiments of the present invention provide systems and apparatuses for user-targeted ad insertion in streaming media. This is analogous to digital programming insertion in cable television broadcasting. A description of digital programming insertion may be found in specifications ANSI/SCTE 35 2004 Digital Program Insertion Cueing Message for Cable by the Society of Cable Telecommunications Engineers, Inc. of Exton, Pa. and ANSI/SCTE 30 2006 Digital Program Insertion Splicing API by the Society of Cable Telecommunications Engineers, Inc. of Exton, Pa., which are incorporated herein by reference.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

ANSI American National Standards Institute
CD-ROM Compact Disc read-only memory
EEPROM Electrically Erasable Programmable Read-Only Memory
IP Internet Protocol
IPTV Internet Protocol Television
RAM Random Access Memory
ROM Read Only Memory
SCTE Society of Cable Telecommunications Engineers
SLA Service Level Agreement
TCP/IP Society of Cable Telecommunications Engineers Further, various technical terms are used throughout this description. An illustrative resource that fleshes out various aspects of these terms can be found in *Newton's Telecom Dictionary* by H. Newton, $22^{nd}$ Edition (2006).

As one skilled in the art will appreciate, embodiments of the present invention may be embodied as, among other things: a method, system, or computer-program product. Accordingly, the embodiments may take the form of at least a hardware embodiment or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The particular embodiments herein are intended in all respects to be illustrative rather than restrictive. Alternative embodiments will become apparent to those skilled in the art to which the present invention pertains without departing from its scope.

Referring to the drawings in general, and initially to FIG. 1 in particular, an exemplary system suitable for use in implementing embodiments of a user-targeted ad insertion in streaming media is shown and designated generally as ad insertion system 100. Ad insertion system 100 is but one example of a suitable ad insertion system and is not intended to suggest any limitation as to scope of use or functionality. Neither should the ad insertion system 100 be interpreted as having any dependency or requirement relating to any one or combination of components or modules illustrated.

It is desirable in Internet Protocol Television (IPTV) broadcasting to target ads to specific users. A targeted ad contains user content, i.e., content that is selected as pertaining to a specific user. A non-targeted ad, or generic ad, contains generic content that is not intended to be specific to a user. Targeting ads to a user may be accomplished by collecting data about the user and selecting user content based on the data. The user content is inserted into an IPTV broadcast at designated insertion points, which are indicated by some type of cue associated with the broadcast. However, the issue arises of what should be done if user content is not available. This situation might occur in the case of a new user, where little or no data has yet been collected. Or, the source of user content may become unavailable for some reason. A typical Service Level Agreement (SLA) for television broadcasts requires an ad to be inserted within three seconds of the insertion point. In the event that user content is not available, it is important to ensure that any existing SLA requirements are met, as well as any other restrictions on dead air time.

Ad insertion system 100 is an exemplary system for inserting user content into streaming media and ensuring that there is no dead air time in the event that the user content is unavailable. With continued reference to FIG. 1, ad insertion system 100 comprises a splicer 105 having three input channels: a primary channel 120, a first insertion channel 125, and a second insertion channel 130. The primary channel 120 carries streaming media in Internet Protocol (IP) format. The first insertion channel 125 carries the user content to be spliced (i.e., inserted) into the streaming media. The second insertion channel 130 carries generic content to be spliced into the streaming media. Additionally, the splicer 105 has a resulting channel 135 output that carries streaming programming with the user content and/or generic content spliced into it. The streaming programming is transmitted through the resulting channel 135 to a user. Channels 120, 125, 130 and 135 may include, but are not limited to, TCP/IP channels.

System 100 further comprises a user content server 140, which transmits the user content over the first insertion channel 125 to the splicer 105. Additionally, a generic content server 145 transmits generic content to a multicast address 150 over an input channel 155. From the multicast address 150, the generic content is transmitted over the second insertion channel 130 to the splicer 105 and over a third insertion channel 160 to the user content server 140. Channels 155 and 160 may include, but are not limited to, TCP/IP channels.

In one embodiment, the splicer 105 receives user content from the user content server 140 for insertion into the streaming media. Exemplary user content may include, but is not limited to, ads that are targeted to a specific user based on criteria about the user. An exemplary user content server 140 may include, but is not limited to, a single server or a collection of servers or other devices working together to supply user content to the splicer 105.

For various reasons, the user content server 140 may not have user content available for a particular user. This may occur, but is not limited to, because the user is new and the criteria for that user does not yet exist. Alternatively, the user may not fit into the demographic for which the streamed media is intended. In the event that user content does not exist for the user, the user content server 140 may join the multicast address 150 and receive the generic content from the multicast address 150 via the third insertion channel 160. Exemplary generic content may include, but is not limited to, a generic ad that is not targeted to the user. The user content server 140 may then transmit the generic content to the splicer 105 via the first insertion channel 125. Alternatively, the user content server 140 may direct the splicer 105 to join the multicast address 150 and receive the generic content directly from the multicast address 150 via the second insertion channel 130.

In the event that the user content server 140 does not respond to the splicer 105 request for user content within a certain time period, the splicer 105 will join the multicast address 150 and receive the generic content directly from the multicast address 150. In one embodiment, the time period is determined such that the time elapsed from the beginning of the insertion point to when the user content is delivered to the user does not exceed any relevant SLA or other restrictions on dead air time.

Figure 2:
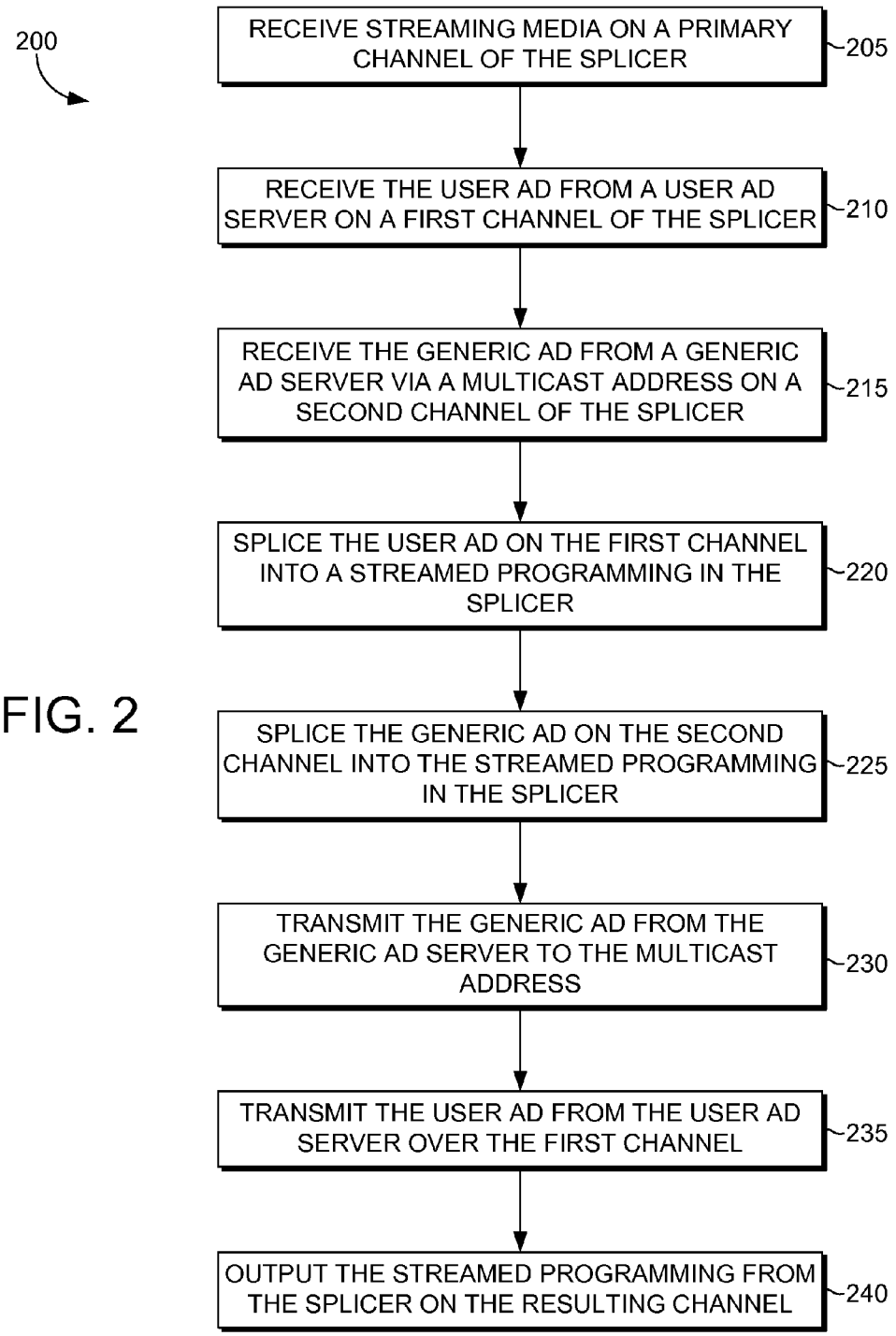
FIG. 2 is a flowchart illustrative of an operation of the exemplary system.

Turning now to FIG. 2, an exemplary operation of the ad insertion system 100 is depicted, designated generally as insertion system operation 200. The insertion system operation 200 is but one example of a suitable insertion system operation and is not intended to suggest any limitation as to scope of use or functionality. Neither should the insertion system operation 200 be interpreted as having any dependency or requirement relating to any one or combination of components or modules illustrated.

Referring to FIG. 1 and FIG. 2, a splicer 105 receives streaming media on a primary channel 120 at step 205. Exemplary streaming media may include, but are not limited to, broadcast television. This is the broadcast into which ads will be inserted. At step 210, a user ad from a user ad server (140) is received on a first channel (120) of the splicer 105. In the event that a user ad is unavailable on the first channel, a generic ad is received from a generic ad server (145) on a second channel (130) of the splicer 105 at step 215. The user ad is spliced into the streamed programming in the splicer 105 at step 220 or, if a generic ad was received instead, the generic ad is spliced into the streamed programming in the splicer 105 at step 225.

The generic ad, which is received on the second channel of the splicer 105, is transmitted from the generic ad server to a multicast address 150 at step 230. The splicer 105 receives the generic ad by joining the multicast address 150 through the second channel at step 215. The user ad, which is received on the first channel of the splicer 105 at step 210, is transmitted from the user ad server over the first channel at step 235.

The streamed programming with the ad inserted into it is transmitted by the splicer 105 to the user over the resulting channel 135 at step 240.

Figure 3A:
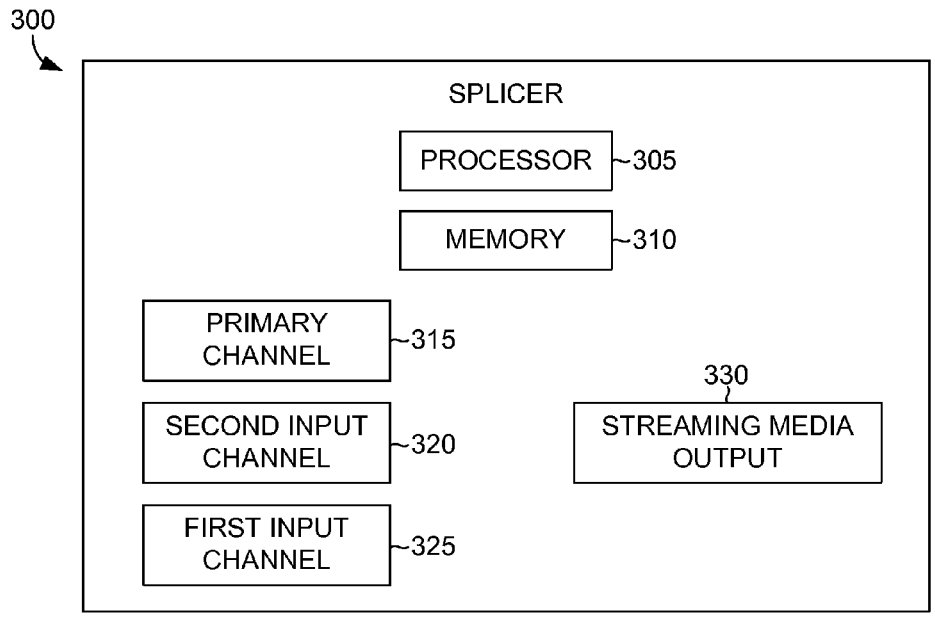
FIG. 3A is a block diagram illustrative of an exemplary splicer used in an implementation of an embodiment of the present invention.
Figure 3B:
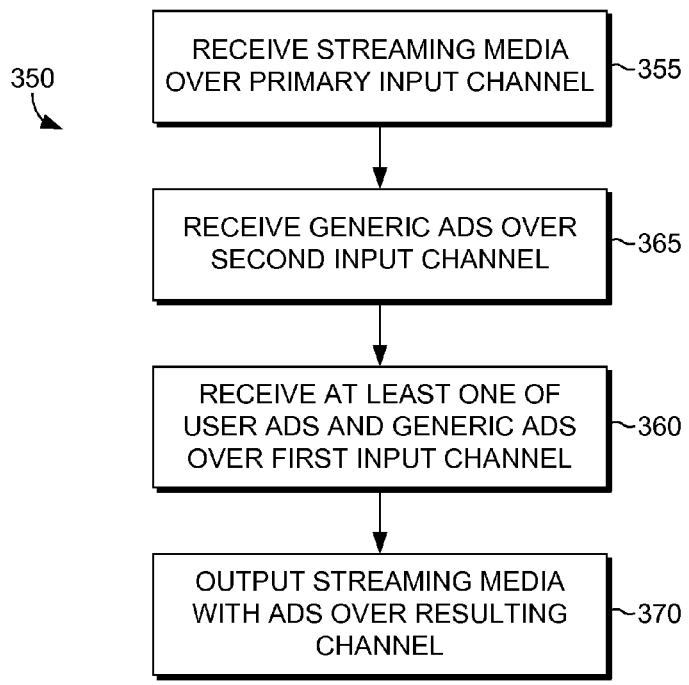
FIG. 3B is a flowchart illustrative of an operation of the exemplary splicer in FIG. 3A.

Turning now to FIG. 3A, an exemplary apparatus for a user-targeted ad insertion in streaming media is depicted, designated generally as splicer 300. By way of background, a splicer is a device for inserting programming or ads into broadcast programming such as in cable television. The splicer typically is used by a broadcast affiliate to insert local ads or programming into regionally broadcast programming. The broadcast programming is received on a primary channel of the splicer, and ads or other programming to be inserted are received on an insertion channel. An upcoming insertion point in the broadcast programming is indicated to the splicer by some means, such as a cue embedded in the broadcast programming. The splicer requests an ad from an ad server, which then sends the ad to the splicer over the insertion channel. The ad is inserted by the splicer into the media stream at the insertion point. Splicer operation for broadcast cable programming is more fully addressed in the aforementioned references ANSI/SCTE 35 2004 and ANSI/SCTE 30 2006. Referring to FIG. 3A, the splicer 300 is but one example of a suitable splicer and is not intended to suggest any limitation as to scope of use or functionality. Neither should the splicer 300 be interpreted as having any dependency or requirement relating to any one or combination of components or modules illustrated. Referring also to FIG. 3B, designated generally as splicer operation 350, an exemplary operation of splicer 300 is depicted. The splicer operation 350 is but one example of a suitable splicer operation and is not intended to suggest any limitation as to scope of use or functionality. Neither should the splicer operation 350 be interpreted as having any dependency or requirement relating to any one or combination of components/modules illustrated.

With continued reference to FIG. 3A and FIG. 3B, the splicer 300 includes a processor module 305, a memory module 310, a primary channel module 315, a second input channel module 320, a first input channel module 325, and a streaming media output module 330. The primary input channel module 315 receives a streaming media broadcast, at step 355, into which ads are to be spliced. Typically, there will be a signal or cue associated with the broadcast indicating an insertion point, which is the point at which an ad is to be inserted. With streaming media broadcasts, technology allows ads to be targeted to a specific user, meaning that the ad content is selected specifically for a user based on information or criteria about the user. At step 360, the first input channel module 325 receives the user-targeted ad if available. If a user-targeted ad is not available, the first input channel module 325 may receive a generic ad at step 360. In one embodiment the user ads are received from a user ad server. When inserting user-targeted ads from a user ad server a timing issue can arise. SLAs in broadcast television require an ad to be inserted within three seconds of the insertion point. Receiving an ad from a user ad server may take up to two seconds. If an ad is not available, a backup ad must be received from another source. However, another two second delay is unacceptable as this would exceed the three second requirement. A solution is to receive an ad from another server via a multicast address, with a preferred time of one second at most. The second input channel module 320 receives generic ads (which are not user-targeted) at step 365. In one embodiment, the generic ads are received from a generic ad server via a multicast address. If a user-targeted ad and a generic ad are not available at the first input channel module 325, then the generic ad received at the second input channel module 320 is inserted, or spliced, into the streaming media. The resultant streaming media with the inserted ad is transmitted to the user by the streaming media output module 330 at step 370.

Referring now to FIG. 4, a flow chart depicts an exemplary preferred embodiment for a user-targeted ad insertion in streaming media, designated generally as ad insertion 400. The ad insertion 400 is but one example of a suitable ad insertion and is not intended to suggest any limitation as to scope of use or functionality. Neither should the ad insertion 400 be interpreted as having any dependency or requirement relating to any one or combination of components or modules illustrated.

Ad insertion 400 is an embodiment for inserting a user ad into streaming media and ensuring that there is no dead air time in the event that the user ad is unavailable. As discussed above, a user ad is targeted or selected for a specific user based on criteria about the user, whereas a generic ad is not targeted or selected for a specific user. Beginning at step 405, streaming media is received on a primary channel 120 of a splicer 105. The splicer 105 receives notification of an insertion point at step 410. An insertion point is a point at which an ad should be inserted into the streaming media. The splicer 105, at step 415, requests an ad from a user ad server (140). The user ad server, which in one embodiment may be a single device or a collection of devices, has access to user ads and selects an appropriate user ad to provide to the splicer 105. At step 420, if a user ad is available from the user ad server, then the splicer 105 receives the user ad from the user ad server at step 425. The user ad is spliced into the streamed programming by the splicer 105 at step 430, and the streamed programming with the inserted user ad is transmitted by the splicer 105 on a resulting channel 135 at step 435.

At step 420, if a user ad is unavailable from the user ad server, then at step 440, if a generic ad is available from the user ad server, the splicer 105 receives the generic ad from the user ad server at step 445. In one embodiment, the user ad server may receive a generic ad from a generic ad server (145) by joining a multicast address 150 to which the generic ad server transmits generic ads. The generic ad received by the splicer 105 at step 445 is spliced into the streamed programming by the splicer 105 at step 430, and the streamed programming with the inserted generic ad is transmitted by the splicer 105 on the resulting channel at step 435.

At step 440, if a generic ad is unavailable from the user ad server, then at step 450, if the splicer 105 is directed by the user ad server to receive a generic ad from the generic ad server via the multicast address 150, then at step 455 the splicer 105 receives a generic ad from the generic ad server by joining the multicast address 150. The generic ad is spliced into the streamed programming by the splicer 105 at step 430, and the streamed programming with the inserted generic ad is transmitted by the splicer 105 on the resulting channel 135 at step 435.

At step 450, if the splicer 105 is not directed by the user ad server to receive a generic ad from the generic ad server, then at step 460, if a certain period of time has not elapsed, step 420 occurs again along with the previously described steps following it. At step 460, if a certain period of time has elapsed, then the splicer 105 receives a generic ad from the generic ad server by joining the multicast address 150 at step 455. The generic ad is spliced into the streamed programming by the splicer 105 at step 430, and the streamed programming with the inserted generic ad is transmitted by the splicer 105 on the resulting channel 135 at step 435.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of operating a media splicer, the method comprising:
    detecting an insertion point in a media stream and responsively requesting insertion content from a user advertisement content server for insertion into the media stream;
    if the user advertisement content server has user-targeted advertisement content available for a user, receiving the user-targeted advertisement content on a first insertion channel from the user advertisement content server as the insertion content for insertion into the media stream;
    if the user advertisement content server does not have the user-targeted advertisement content available, receiving first generic advertisement content on the first insertion channel from the user advertisement content server as the insertion content for insertion into the media stream, wherein the user advertisement content server is configured to receive the first generic advertisement content from a generic advertisement content server by joining a multicast address to which the generic advertisement content server transmits generic advertisement content;

if the user advertisement content server does not respond to the request for the insertion content within a specified time period, joining the multicast address to receive second generic advertisement content on a second insertion channel from the generic advertisement content server as the insertion content for insertion into the media stream; and splicing the insertion content into the media stream at the insertion point and outputting the media stream with the insertion content spliced in for transmission to the user.

2. The method of claim 1 wherein the user-targeted advertisement content received from the user advertisement content server is targeted to the user based on criteria about the user.

3. The method of claim 1 wherein the user advertisement content server is configured to direct the media splicer to join the multicast address to receive the second generic advertisement content from the generic advertisement content server.

4. The method of claim 1 wherein the specified time period is determined such that time elapsed from the insertion point to when the insertion content is delivered to the user does not exceed a restriction on dead air time.

5. The method of claim 1 wherein the specified time period is determined such that time elapsed from the insertion point to when the insertion content is delivered to the user does not exceed a service level agreement.

6. The method of claim 1 wherein the specified time period is determined such that time elapsed from the insertion point to when the insertion content is delivered to the user does not exceed three seconds.

7. A media splicer comprising:

a processor and a memory, the media splicer configured to:

detect an insertion point in a media stream and responsively request insertion content from a user advertisement content server for insertion into the media stream;

if the user advertisement content server has user-targeted advertisement content available for a user, receive the user-targeted advertisement content on a first insertion channel from the user advertisement content server as the insertion content for insertion into the media stream;

if the user advertisement content server does not have the user-targeted advertisement content available, receive first generic advertisement content on the first insertion channel from the user advertisement content server as the insertion content for insertion into the media stream, wherein the user advertisement content server is configured to receive the first generic advertisement content from a generic advertisement content server by joining a multicast address to which the generic advertisement content server transmits generic advertisement content;

if the user advertisement content server does not respond to the request for the insertion content within a specified time period, join the multicast address to receive second generic advertisement content on a second insertion channel from the generic advertisement content server as the insertion content for insertion into the media stream; and splice the insertion content into the media stream at the insertion point and output the media stream with the insertion content spliced in for transmission to the user.

8. The media splicer of claim 7 wherein the user-targeted advertisement content received from the user advertisement content server is targeted to the user based on criteria about the user.

9. The media splicer of claim 7 wherein the user advertisement content server is configured to direct the media splicer to join the multicast address to receive the second generic advertisement content from the generic advertisement content server.

10. The media splicer of claim 7 wherein the specified time period is determined such that time elapsed from the insertion point to when the insertion content is delivered to the user does not exceed a restriction on dead air time.

11. The media splicer of claim 7 wherein the specified time period is determined such that time elapsed from the insertion point to when the insertion content is delivered to the user does not exceed a service level agreement.

12. The media splicer of claim 7 wherein the specified time period is determined such that time elapsed from the insertion point to when the insertion content is delivered to the user does not exceed three seconds.

* * * * *